United States Patent
Schilling et al.

(12)

(10) Patent No.: US 6,489,391 B1
(45) Date of Patent: Dec. 3, 2002

(54) PROCESS FOR PREPARING AQUEOUS, PROTECTIVE COLLOID STABILIZED VINYL ESTER HOMOPOLYMER AND COPOLYMER DISPERSIONS

(75) Inventors: Bernd Schilling, Macungie, PA (US); Georg Riepl, Emmerting (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 09/509,285

(22) PCT Filed: Sep. 17, 1998

(86) PCT No.: PCT/EP98/05919

§ 371 (c)(1),
(2), (4) Date: May 22, 2000

(87) PCT Pub. No.: WO99/16826

PCT Pub. Date: Apr. 8, 1999

(30) Foreign Application Priority Data

Sep. 26, 1997 (DE) .......................................... 197 42 678

(51) Int. Cl.[7] .............................................. C08L 29/04
(52) U.S. Cl. ...................... 524/503; 156/332; 524/459
(58) Field of Search ................................ 524/459, 503; 156/332; 427/207.1, 280, 342

(56) References Cited

U.S. PATENT DOCUMENTS

| 3,897,577 A | * | 7/1975 | Hymes ........................ 427/277 |
| 4,323,492 A | * | 4/1982 | Zimmermann et al. ..... 524/388 |
| 4,481,328 A | * | 11/1984 | Harreus et al. .............. 524/493 |
| 4,614,755 A | * | 9/1986 | Rodgers ......................... 524/5 |
| 4,708,978 A | * | 11/1987 | Rodgers ......................... 524/5 |
| 5,340,858 A | | 8/1994 | Bauer et al. |
| 5,430,092 A | | 7/1995 | Aydin et al. |
| 5,777,015 A | * | 7/1998 | Jakob et al. ................. 524/354 |
| 5,994,438 A | * | 11/1999 | Geissler et al. ............. 524/272 |

FOREIGN PATENT DOCUMENTS

| DE | 37 24331 | 2/1989 |
| EP | 0 567 812 | 11/1993 |
| EP | 0 614 922 | 9/1994 |
| EP | 0 708 122 | 4/1996 |
| GB | 1158088 | 7/1969 |
| WO | 96/11234 | 4/1986 |

OTHER PUBLICATIONS

Derwent Abstract corresponding to De 37 24331 [AN–1989–040026].

* cited by examiner

*Primary Examiner*—Judy M. Reddick
(74) *Attorney, Agent, or Firm*—Brooks & Kushman P.C.

(57) ABSTRACT

The invention provides a method of producing aqueous, protective colloid stabilized vinyl ester homo- and co-polymer dispersions with a defined solids content by emulsion polymerization in the presence of a protective colloid. The method specifies that a dispersion with a solids content lower than the defined solids content is produced and then thickened to the defined solids content after the polymerization has been completed. The dispersion is thickened by adding a polymer powder which is of the same polymer composition as the emulsion polymerizate and which can be redispersed in water.

10 Claims, No Drawings

PROCESS FOR PREPARING AQUEOUS, PROTECTIVE COLLOID STABILIZED VINYL ESTER HOMOPOLYMER AND COPOLYMER DISPERSIONS

BACKGROUND OF THE INVENTION

1) Field of the Invention

The invention relates to a process for preparing aqueous, protective colloid stabilized vinyl ester homopolymer and copolymer dispersions of defined solids content.

2) Background Art

Aqueous, polyvinyl alcohol stabilized dispersions of vinyl ester homopolymers or vinyl ester copolymers are used in particular as adhesives.

Dispersions having particular defined solids contents are required depending on the application in which these dispersions are to be used. Since the solids content of a polymer dispersion cannot be controlled precisely during the polymerization, and can only be increased even after the end of the polymerization by means of technically complex measures, the removal of water in vacuo being one example, which increases the production costs by prolonging the preparation times, the procedure adopted in practice is to prepare polyvinyl ester dispersions with a solids content higher than that required and then dilute the dispersion to the required solids content by adding water.

A problem with this "water dilution process" is that in the range of solids contents which is relevant in practice, of between 40% and 60%, the viscosity of polyvinyl alcohol stabilized polyvinyl ester dispersions does not rise linearly with the solids content; in this range, rather, the viscosity of the dispersions increases exponentially. A consequence of this is that, in the polymerization of dispersions having a solids content higher than that to be established subsequently by water dilution, polymerization is carried out with polymerization batches which are of relatively high viscosity. The relatively high viscosity hinders the dissipation of heat by way of the reactor walls, so necessitating the installation of additional cooling equipment such as reflux condensers, leading to the formation of wall deposits, and, furthermore, markedly increasing the polymerization times. A further disadvantage is that the removal of residual monomers from dispersions of relatively high viscosity is made more difficult.

DE-A 3724331 discloses a process in which the viscosity of aqueous polyvinyl ester dispersions is increased by adding pulverulent copolymers of vinyl alcohol-1-methylvinyl alcohol copolymers. With these rheological additives it is, indeed, possible to increase markedly the viscosity of the dispersions with a virtually unchanged solids content; however, this rheological additive does alter the performance properties of the dispersions. For example, even low-level additions of these additives, which are readily soluble in cold water, impair the water resistance.

In order to increase the solids content it is proposed in a number of patent applications, for example, EP-A 614922 (US-A 5430092), EP-A 567812 (US-A 5340858), EP-A 708122, and WO-A 96/11234, to prepare the polymer dispersions in the presence of seed latices which are included in whole or in part in the initial charge or are metered in their entirety, giving polymer dispersions having a biomodal particle size distribution. A disadvantage of this procedure is the predominantly highly complex process regime. Furthermore, although dispersions of high solids content are obtainable by means of this procedure, this solids content also can no longer be increased subsequently.

SUMMARY OF THE INVENTION

The object was therefore to provide a process for preparing aqueous, protective colloid stabilized polyvinyl ester dispersions by means of which polymer dispersions of defined solids content are obtainable without the occurrence of the abovementioned disadvantages of the water dilution process, without the need for complex process steps, and without adversely affecting the performance properties of the polymer dispersions.

The invention provides a process for preparing aqueous, protective colloid stabilized vinyl ester homopolymer and copolymer dispersions of defined solids content by emulsion polymerization in the presence of protective colloid, characterized in that it comprises preparing a dispersion with a solids content lower than the defined solids content and, after the end of the polymerization, thickening the dispersion to the defined solids content by adding water-redispersible polymer powder of the same polymer composition, and prepared by the same process with subsequent drying, as the emulsion polymer.

The procedure of the invention is suitable for polymerizing one or more monomers from the group of the vinyl esters of unbranched or branched alkylcarboxylic acids having 1 to 15 carbon atoms, or mixtures of said vinyl ester monomers with one or more comonomers from the group of the methacrylic esters and acrylic esters of unbranched or branched alcohols having 1 to 12 carbon atoms, the fumaric and maleic monoesters or diesters of unbranched or branched alcohols having 1 to 12 carbon atoms, the dienes such as butadiene or isoprene, the olefins such as ethene or propene, the vinyl halides such as vinyl chloride.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having 5 to 11 carbon atoms, for example, VeoVa9® or VeoVa10® (trade names of Shell). Vinyl acetate is particularly preferred.

Preferred methacrylic esters or acrylic esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, and 2-ethylhexyl acrylate.

Preferred ester groups of the fumaric and maleic acid are methyl, ethyl, n-propyl, iso-propyl, n-butyl, iso-butyl, t-butyl, hexyl, ethylhexyl, and dodecyl groups.

If desired it is also possible to copolymerize from 0.05 to 10.0% by weight of auxiliary monomers, based on the overall weight of the monomer mixture. Examples of auxiliary monomers are ethylenically unsaturated carboxylic acids, preferably acrylic acid or methacrylic acid; ethylenically unsaturated carboxamides, preferably acrylamides; ethylenically unsaturated sulfonic acids and/or their salts, preferably vinylsulfonic acid, 2-acrylamido-2-methylpropanesulfonic acid. Further examples are pre-crosslinking comonomers such as polyethylenically unsaturated comonomers, for example, divinyl adipate, diallyl maleate, allyl methacrylate or triallyl cyanurate, or post-crosslinking comonomers, for example, acrylamidoglycolic acid (AGA), methacrylamidoglycolic acid methyl ester (MAGME), N-methylolacrylamide (NMA), N-methylolmethacrylamide, N-methylolallylcarbamate, alkyl ethers, such as the isobutoxy ether, or esters of N-methylolacrylamide, of N-methylolmethacrylamide or of N-methylolallylcarbamate.

Examples of preferred vinyl ester polymers which comprise if desired said auxiliary monomer units in the stated amounts are:

vinyl acetate and vinylpropionate polymers;

vinyl ester-ethylene copolymers such as vinyl acetate-ethylene copolymers having an ethylene content of from 1 to 60% by weight;

vinyl ester-ethylene-vinyl chloride copolymers having an ethylene content of from 1 to 40% by weight and a vinyl chloride content of from 20 to 90% by weight, vinyl esters present being preferably vinyl acetate and/or vinylpropionate and/or one or more copolymerizable vinyl esters such as vinyl laurate, vinyl pivalate, vinyl 2-ethylhexanoic acid ester, vinyl esters of an alpha-branched carboxylic acid, especially Versatic acid vinyl esters;

vinyl acetate copolymers with from 1 to 50% by weight of one or more copolymerizable vinyl esters such as vinyl laurate, vinyl pivalate, vinyl 2-ethylhexanoic acid ester, vinyl esters of an alpha-branched carboxylic acid, especially Versatic acid vinyl esters (VeoVa9®, VeoVa10®), which if desired also contain from 1 to 40% by weight of ethylene;

vinyl ester-acrylic ester copolymers with from 30 to 90% by weight of vinyl ester, especially vinyl acetate, and from 1 to 60% by weight of acrylic ester, especially n-butyl acrylate or 2-ethylhexyl acrylate, which if desired also contain from 1 to 40% by weight of ethylene;

vinyl ester-acrylic ester copolymers with from 30 to 75% by weight of vinyl acetate, from 1 to 30% by weight of vinyl laurate or vinyl esters of an alpha-branched carboxylic acid, especially Versatic acid vinyl ester, from 1 to 30% by weight of acrylic ester, especially n-butyl acrylate or 2-ethylhexyl acrylate, which if desired also contain from 1 to 40% by weight of ethylene;

vinyl ester copolymers with esters of maleic acid or fumaric acid such as diisopropyl, di-n-butyl, di-t-butyl, di-ethylhexyl, methyl t-butyl esters, for example, vinyl acetate copolymers with from 10 to 60% by weight of one or more of said maleic/fumaric esters, which if desired also contain ethylene or further copolymerizable vinyl esters such as vinyl laurate or Versatic acid vinyl esters.

Examples of suitable protective colloids are polyvinyl alcohols having a content of from 75 to 100 mol %, preferably from 78 to 95 mol %, of vinyl alcohol units and a Höppler viscosity of from 10 to 25 mPas, polyvinylpyrrolidones having a molecular weight of preferably from 5000 to 400,000; poly-saccharides in water-soluble form such as starches (amylose and amylopectin), celluloses and their carboxymethyl, methyl, hydroxyethyl, hydroxypropyl derivatives, for example, hydroxyethylcelluloses having a degree of substitution range of from 1.5 to 3; proteins such as casein, soya protein, gelatin; ligninsulfonates, synthetic polymers such as poly (meth) acrylic acid, poly (meth) acrylamide, poly-vinylsulfonic acids and water-soluble copolymers thereof; melamine-formaldehyde sulfonates, naphthalene-formaldehyde sulfonates, styrene-maleic acid copolymers and vinyl ether-maleic acid copolymers.

Greatest preference is given to partially saponified polyvinyl alcohols with from 78 to 95 mol % of vinyl alcohol units and a Höppler viscosity from 10 to 25 mPas (4% strength aqueous solution, method of Höppler in accordance with DIN 53015). Said partially saponified polyvinyl alcohols can also be used, if desired, in a mixture with further protective colloids from the abovementioned group. The protective colloids are generally used in an amount of from 1 to 15% by weight, based on the overall weight of the monomers.

In addition to the protective colloid it is also possible if desired to use emulsifiers in the polymerization. The amounts added are in this case generally from 0.01 to 1% by weight, based on the overall weight of the monomers. Suitable emulsifiers are, for example, anionic surfactants, such as alkyl sulfates having a chain length of 8 to 18 carbon atoms, alkyl and alkylaryl ether sulfates having 8 to 18 carbon atoms in the hydrophobic radical and up to 40 ethylene or propylene oxide units, alkyl- or alkylarylsulfonates having 8 to 18 carbon atoms, esters and monoesters of sulfosuccinic acid with monovalent alcohols or alkylphenols. Suitable nonionic surfactants are, for example, alkyl polyglycol ethers or alkylaryl polyglycol ethers having from 8 to 40 ethylene oxide units.

The polymerization can be conducted batchwise or continuously, with or without the use of seed latices, with all or individual constituents of the reaction mixture being included in the initial charge, or with the constituents, or certain constituents, of the reaction mixture being included in part in the initial charge and in part metered in subsequently, or by the metering process without an initial charge. Normally, the makeup water is included in its entirety in the initial charge together with the vinyl ester monomer fraction. The dispersants, such as protective colloid and, if appropriate, emulsifiers, can be included in whole or in part in the initial charge.

The polymerization is preferably conducted within a temperature range from 40° C. to 80° C. and initiated with the methods commonly used for emulsion polymerization. In the case of the copolymerization of gaseous comonomers such as ethylene the reaction is operated under pressure; it is preferred to operate under a pressure of up to 40 bar abs.

Initiation takes place by means of the water-soluble free-radical initiators which are customary for emulsion polymerization, and which are used preferably in amounts of from 0.01 to 1.0% by weight, based on the overall weight of the monomers. Examples thereof are ammonium persulfate and potassium persulfate, alkyl hydroperoxides, such as t-butyl hydroperoxide; hydrogen peroxide. If desired, said free-radical initiators can also be combined in a known manner with from 0.01 to 0.5% by weight, based on the overall weight of the monomers, of reducing agents. Suitable reducing agents are, for example, formaldehyde sulfoxylate salts, sodium bisulfite or ascorbic acid. The initiator can be included in whole or in part in the initial charge or can be added continuously or in stages in the course of the polymerization. In the case of redox initiation, one or both redox catalyst components are preferably metered during the polymerization.

The pH range desired for the polymerization, which generally lies between 3 and 7, can be established in a known manner by means of acids, bases or customary buffer salts, such as alkali metal phosphates or alkali metal carbonates. For adjusting molecular weight it is possible to add the commonly used regulators during the polymerization, for example, mercaptans, aldehydes and chlorinated hydrocarbons.

After the end of the polymerization, the dispersion can be distilled, or stripped with steam or inert gas, in order to reduce further the content of volatile constituents. These procedures are known to the skilled worker and therefore require no further explanation.

The polymerization is generally conducted so as to result in a solids content of from 30 to 65% by weight, preferably from 40 to 50% by weight. The level of the solids content aimed at after the end of the polymerization depends in this case on the viscosity of the resulting dispersion, which should not exceed a value of from 10,000 to 15,000 mPas (Brookfield viscosity at 20 r).

The water-redispersible polymer powder which is added to the polymer dispersion in order to increase the solids content has the same composition as the polymer of the aqueous polymer dispersion and is prepared with the same process. The drying of the dispersion thus obtained can take place by means of spray drying, freeze drying or fluidized bed drying. Preference is given to spray drying in customary spray drying facilities, where atomization can take place by means of single-, dual- or multi-substance nozzles or with a rotating disk. The exit temperature is generally chosen within the range from 55° C. to 100° C., preferably from 65° C. to 90° C., depending on the facility, the Tg of the resin, and the desired degree of drying.

If desired, one or more of the abovementioned protective colloids used in the polymerization can be added to the dispersion as an atomization aid for spray drying. In the case of this process step, preference is given to the addition of from 5 to 20% by weight of protective colloid.

The water-redispersible polymer powder is incorporated into the aqueous dispersion by means of conventional mixer-stirrer units. The amount added depends on the target solids content. In general, solids contents of from 50 to 75% by weight, preferably from 50 to 65% by weight, are established. The viscosity of the dispersions in this case is from 20,000 to 60,000 mPas (Brookfield viscosity at 20 r).

The dispersions prepared in accordance with the invention are suitable as adhesives for the adhesive bonding of porous substrates such as wood, paperboard and paper. The adhesive dispersions are particularly suitable as wood adhesives, wood flooring adhesives, packaging adhesives and bookbinding adhesives.

For these applications, the adhesive dispersions can be modified with the corresponding additives. Suitable additives are fillers such as chalk or gypsum. It is also possible to add wetting agents, dispersing agents, thickeners, defoamers and/or preservatives to the adhesive dispersion.

Specifically for application as wood adhesive, in order to increase the resistance to cold and hot water, it is possible to add the crosslinking agents customary for this purpose, for example, water-soluble metal salts of monobasic acids such as Al(III) and Zr(IV) salts. It is preferred to add aluminum chloride and aluminum nitrate.

With the procedure according to the invention it is possible to obtain dispersions having a high solids content without the occurrence of the disadvantages of the processes from the prior art, such as long polymerization times, complex process regimes. The performance properties of the dispersions are not adversely affected by the procedure according to the invention. Above all, the drastic reduction in the polymerization time brings considerable economic advantages.

The examples which follow serve to further elucidate the invention:

Comparative Example 1

Preparation of a Dispersion with a Solids Content of 50% by Weight by the Water Dilution Process In a 120 l reactor with automatic metering devices, temperature regulation, anchor stirrer, jacket heat dissipation system and reflux condenser, 25 kg of vinyl acetate were emulsified in 50 l of an aqueous 10% polyvinyl alcohol solution. The polyvinyl alcohol had a degree of hydrolysis of 88 mol % and a viscosity of 26 mPas (4% strength aqueous solution). Subsequently, the mixture was heated to 60° C. and the polymerization was started using the initiator system ascorbic acid/ammonium persulfate, with 0.1% of acetaldehyde as a 10% strength aqueous solution being metered in parallel with the initiator metering. About 10 minutes after the onset of the polymerization, the vinyl acetate/water azeotrope came to boiling, the temperature regulation and the initiator metering being controlled in such a way that a moderate reflux of the azeotrope over the reflux condenser was established. Thereafter, a further 30 kg of vinyl acetate were metered in such that the moderate reflux of the azeotrope was retained. After a reaction time of about 6 hours, the polymerization was at an end.

The resulting dispersion had a solids content of about 57% and a Brookfield viscosity of about 60,000 mPas at 20 r. In order to establish the target solids content of 50%, the dispersion was diluted with 15 l of water. A dispersion was obtained having a solids content of 50% and a Brookfield viscosity of 15,000 mPas at 20 r.

EXAMPLE 1

Preparation of a Dispersion with a Solids Content of 50% by Weight by the Powder Thickening Process As in Comparative Example 1, in a 120 l reactor with automatic metering devices, temperature regulation, anchor stirrer, jacket heat dissipation system and reflux condenser, 25 kg of vinyl acetate were emulsified in 50 l of an aqueous 10% polyvinyl alcohol solution. The polyvinyl alcohol had a degree of hydrolysis of 88 mol % and a viscosity of 26 mPas (4% strength aqueous solution). Subsequently, the mixture was heated to 60° C. and the polymerization was started using the initiator system ascorbic acid/ammonium persulfate, with 0.1% of acetaldehyde as a 10% strength aqueous solution being metered in parallel with the initiator metering. About 10 minutes after the onset of the polymerization, the vinyl acetate/water azeotrope came to boiling, the temperature regulation and the initiator metering being controlled in such a way that a moderate reflux of the azeotrope over the reflux condenser was established. In contradistinction to the procedure of Comparative Example 1, thereafter, a further 30 kg of vinyl acetate were metered in together with 20 l of water such that the moderate reflux of the azeotrope was retained. The reaction time shortened to 3 hours.

The resulting dispersion had a solids content of about 48% and a Brookfield viscosity of about 10,000 mPas at 20 r.

In order to establish the target solids content of 50%, the dispersion was admixed with 5 kg of a dispersion powder which was obtained by spray-drying an aqueous polymer dispersion which had been prepared with the same process. To prepare the dispersion powder, the polyvinyl acetate dispersion was diluted to a solids content of 35%. Drying was carried out in a Nubilosa spray dryer at an exit temperature of 820° C. and a compressed-air pressure upstream of the 2-substance nozzle of 4 bar.

Following addition of the dispersion powder, a dispersion was obtained having a solids content of 50% and a Brookfield viscosity of 15,000 mPas at 20 r.

Performance Testing

The dispersions obtained with the processes according to Comparative Example 1 and Example 1 were tested for their suitability as wood adhesives. For this purpose, the bond strength was determined in accordance with DIN EN 204/205 and the heat stability of the bonds in accordance with WATT 91.

Bond Strength in Accordance with DIN EN 204/205

The specimens were prepared in accordance with DIN EN 205. For this purpose, in each case two beechwood panels each 5 mm thick, 130 mm wide and 600 mm long were bonded to one another using the adhesive dispersion to be tested, under pressure distributed uniformly over the bond area, the bonded panels were divided into test specimens each 150 mm long, and these specimens were stored in accordance with DIN EN 204.

For the test for assignment to the stress group D2, the specimens were stored, after gluing, for 7 days under standard climatic conditions (23° C., 50% atmospheric humidity), then for 3 hours in cold water at 23° C. and finally for 7 days again under standard climatic conditions.

Following storage, the test specimens were used to determine the bond strength in a tensile shear test, the bonded test specimens being pulled apart and loaded to fracture with a tensile testing machine at a pulling speed of 50 mm/min. The maximum force $F_{max}$ occurring at fracture was measured. The bond strength T is calculated in accordance with DIN EN 205 from $T=F_{max}/A$, where A is the bonded test area in $mm^2$.

The results of the testing of the bond strength are collated in Table 1.

Testing of the Heat Stability in Accordance with WATT 91:

The specimens were produced and divided in accordance with EN 205 and stored for 7 days under standard climatic conditions. Thereafter, they were stored for 1 hour at a temperature of 80° C. in a heating cabinet preheated to 80° C. Immediately after the hot storage, the heat stability was determined in the tensile shear test in analogy to DIN EN 205, the bonded test specimens being pulled apart and loaded to fracture with a tensile testing machine at a pulling speed of 50 mm/min. The maximum force $F_{max}$ occurring at fracture was measured. The heat stability is calculated from Fmax/A, where A is the bonded test area in $mm^2$.

The results of testing the heat stability are likewise collated in Table 1.

TABLE 1

| Example | Comparative Example 1 | Example 1 |
|---|---|---|
| Bond strength (N/mm²): D2 value | 9.5 | 9.5 |
| Heat stability (N/mm²): | 7.0 | 7.0 |

What is claimed is:

1. A process for manufacturing a protective colloid-stabilized vinyl ester homopolymer or copolymer product dispersion of a specified polymer solids content in the range of 50 to 75 weight percent solids based on the weight of the dispersion, and a Brookfield viscosity measured at 20 rpm of from 20,000 mPas to 60,000 mPas, said process comprising the steps of:

a) emulsion polymerizing one or more vinyl ester monomers and, in the case of vinyl ester copolymers, one or more vinyl ester monomers and one or more non-vinyl ester comonomers, in the presence of a protective colloid, to form a first protective colloid-stabilized vinyl ester homopolymer or copolymer dispersion, and spray drying said first protective colloid-stabilized vinyl ester homopolymer or copolymer dispersion to form a water-redispersible polymer powder;

b) emulsion polymerizing the same vinyl ester monomers and non-vinyl ester comonomers employed in step a) in the presence of a protective colloid to form a second protective colloid-stabilized vinyl ester homopolymer or copolymer dispersion having a Brookfield viscosity measured at 20 rpm of from 10,000 mPas to 15,000 mPas and a solids content lower than said specified solids content and in the range of 30 to 65 weight percent based on the weight of said second protective colloid-stabilized vinyl ester homopolymer or copolymer dispersion; and c) adding to said second protective colloid-stabilized vinyl ester homopolymer or copolymer dispersion, sufficient of said water-redispersible polymer powder to increase the solids content of said second protective colloid-stabilized dispersion to the specified solids content of said vinyl ester homopolymer or copolymer product dispersion, and to increase the viscosity to the range of from 20,000 mPas to 60,000 mPas.

2. The process of claim 1 wherein said protective colloid comprises a polyvinyl alcohol containing from 75 to 100 mol percent of vinyl alcohol units and a Höppler viscosity of from 10 to 25 mPas measured in 4% by weight aqueous solution in accordance with DIN 53015.

3. The process of claim 1 wherein the solids content of the protective colloid-stabilized vinyl ester homopolymer or copolymer dispersion b) is from 40% by weight to 50% by weight based on the weight of the dispersion.

4. The process of claim 1 wherein said vinyl ester homopolymer or copolymer dispersions a) and b) are prepared by polymerizing monomer(s) or monomer mixtures selected from the group consisting of vinyl acetate; vinyl propionate; vinyl ester(s) and ethylene with an ethylene content in the polymer of 1 to 60 weight percent based on the weight of the polymer; and vinyl ester(s), ethylene, and vinyl chloride, with an ethylene content of 1 to 40 weight percent and a vinyl chloride content of 20 to 90 weight percent, these weight percents based on the weight of said homopolymer or copolymer.

5. The process of claim 1 wherein the homopolymer or copolymer dispersions a) and b) are both vinyl acetate homopolymer dispersions.

6. The process of claim 1, wherein the homopolymer or copolymer dispersions a) and b) are both "vinyl acetate-vinyl propionate copolymer dispersions".

7. A process for manufacturing a protective colloid-stabilized vinyl ester homopolymer or copolymer product dispersion of a specified polymer solids content in the range of 50 to 65 weight percent solids based on the weight of the dispersion, and a Brookfield viscosity measured at 20 rpm of from 20,000 mPas to 60,000 mPas, said process comprising the steps of:

a) emulsion polymerizing one or more vinyl ester monomers and, in the case of vinyl ester copolymers, one or more vinyl ester monomers and one or more non-vinyl ester comonomers, in the presence of a protective colloid, to form a first protective colloid-stabilized vinyl ester homopolymer or copolymer dispersion, and spray drying said first protective colloid-stabilized vinyl ester homopolymer or copolymer dispersion to form a water-redispersible polymer powder;

emulsion polymerizing the same vinyl ester monomers and non-vinyl ester comonomers employed in step a) in the presence of a protective colloid to form a second protective colloid-stabilized vinyl ester homopolymer or copolymer dispersion having a Brookfield viscosity measured at 20 rpm of from 10,000 mPas to 15,000 mPas and a solids content lower than said specified solids content and in the range of 40 to 50 weight percent based on the weight of said second protective colloid-stabilized vinyl ester homopolymer or copolymer dispersion; and c) adding to said second protective colloid-stabilized vinyl ester homopolymer or copolymer dispersion, sufficient of said water-redispersible polymer powder to increase the solids content of said second protective colloid-stabilized dispersion to the specified solids content of said vinyl ester homopolymer or copolymer product dispersion, and to increase the viscosity to the range of from 20,000 mPas to 60,000 mPas.

8. In the process of adhesively bonding of porous substrates wherein an aqueous polymer dispersion is employed as an adhesive, the improvement comprising bonding said porous substrates with a protective colloid-stabilized vinyl ester homopolymer or copolymer product dispersion prepared by the process of claim 1.

9. The process of claim 8 wherein at least one porous substrate is wood, and wherein at least one water soluble salt of a monobasic acid is added to said protective colloid-stabilized vinyl ester homopolymer or copolymer dispersion as a crosslinker in an amount effective to increase the water resistance of the adhesive as compared to an adhesive of the same polymer content not containing said crosslinker.

10. The process of claim 9 wherein said crosslinker is selected from the group consisting of aluminum (III) salts, zirconium (IV) salts, and mixtures thereof.

* * * * *